June 4, 1940.　　　E. B. MORGAN ET AL　　　2,203,304
SEAT END STANDARD
Filed June 25, 1937　　　3 Sheets-Sheet 1

Witness:
Geo. L. Chapel

INVENTORS.
Erving B. Morgan
Clyde E. Yost
BY Rice and Rice
ATTORNEYS.

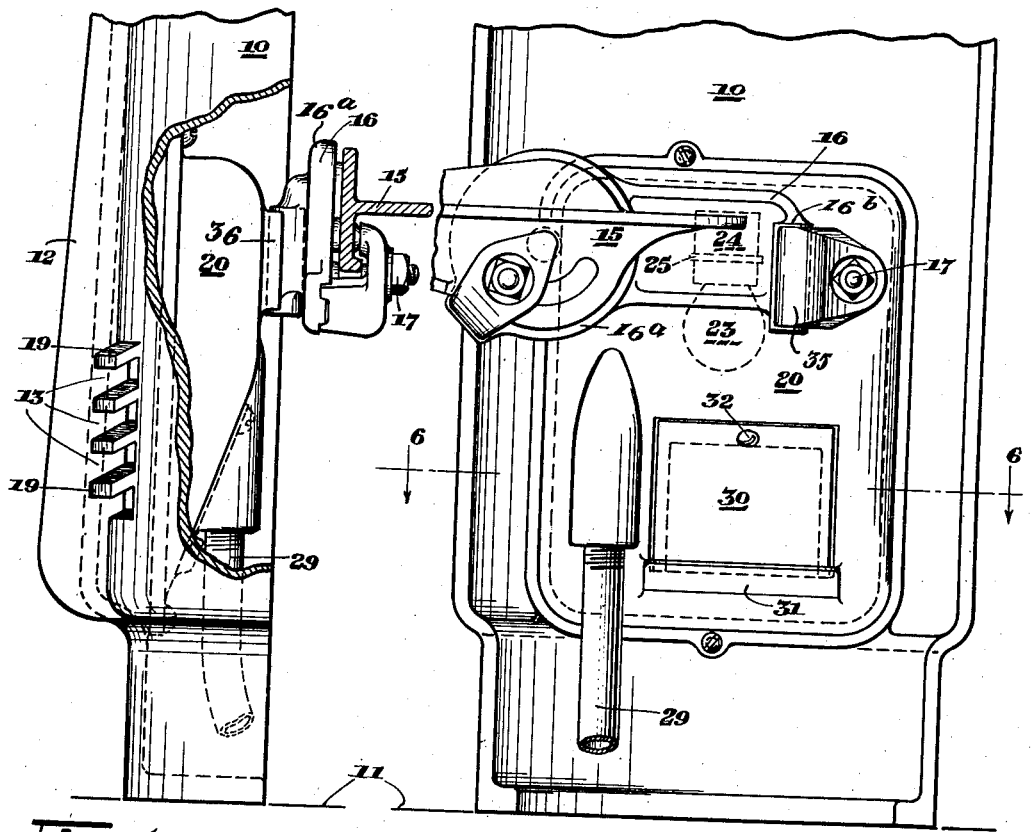
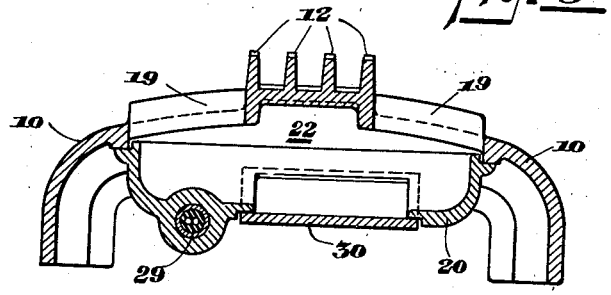

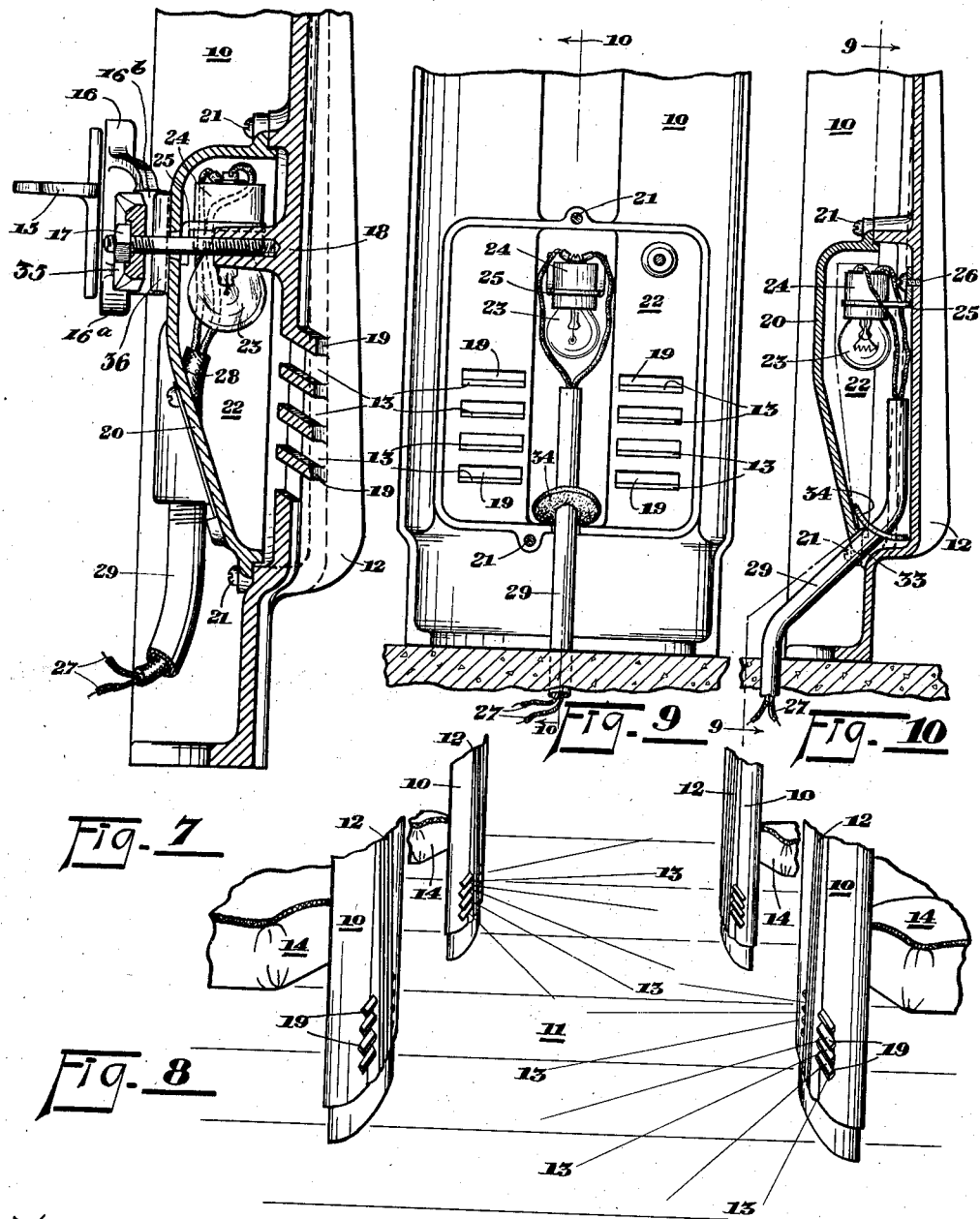

Patented June 4, 1940

2,203,304

UNITED STATES PATENT OFFICE 2,203,304

SEAT END STANDARD

Erving B. Morgan and Clyde E. Yost, Grand Rapids, Mich., assignors to American Seating Company, Grand Rapids, Mich., a corporation of New Jersey Application June 25, 1937, Serial No. 150,248

9 Claims. (Cl. 240—4)

The present invention relates to seat end standards and more particularly to seat end standards provided with means for illuminating aisles of theatres, aisles of cinema houses or aisles of other public or semi-public halls or auditoriums.

The primary objects of the instant invention are to provide a seat end standard of the character above indicated which has certain novel features over aisle lighting seat end standards of the prior patented art; to provide such a seat end standard whose lighting means is disposed a sufficient distance below and away from the supported seat and its occupant to preclude annoyance to the occupant of excessively radiated heat from the lighting means; to provide such a seat end standard whose lighting means is disposed near the floor for better illuminating the adjacent aisle; to provide such a seat end standard whose light emitting openings are so formed that the emitted light is spread and diffused upon the adjacent aisle floor; to provide such a seat end standard whose light emitting openings are so formed that the light emitted therethrough is without glare to the otherwise discomfort of patrons occupying aisle seats rearwardly of or across from the emitted light; and, to provide such a seat end standard which is attractive in appearance, utilitarian in use and reasonably economical in manufacture.

Illustrative embodiments of the invention are shown in the accompanying drawings, wherein:

Figure 4 is a fragmentary side elevational view of the seat end standard, a portion of the incandescent light bulb housing being broken away;

Figure 5 is a fragmentary rear elevational view of the seat end standard;

Figure 6 is a sectional view on lines 6—6 of Figures 1 and 5;

Figure 7 is a sectional view on line 7—7 of Figure 1;

Figure 8 is a fragmentary perspective view showing a typical installation of the seat end standards of the instant invention disposed on opposite sides of an aisle;

Figure 9 is a fragmentary rear elevational view of a modified form of a seat end standard and on line 9—9 of Figure 10, the cover plate of the incandescent light bulb housing having been removed;

Figure 10 is a sectional view thereof on line 10—10 of Figure 9.

Figure 2:
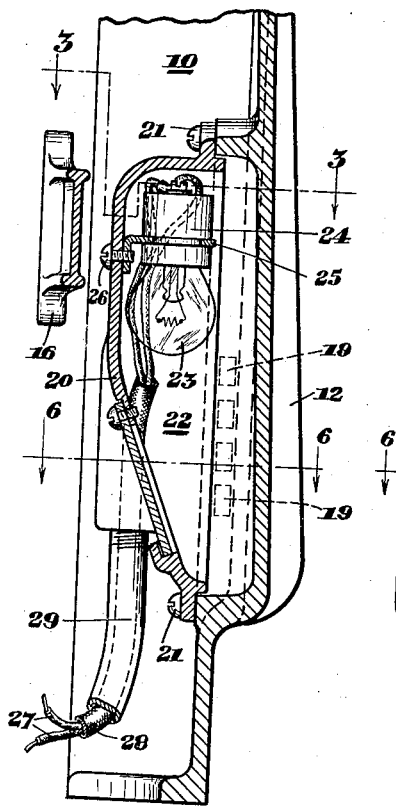
Figure 2 is a sectional view thereof on line 2—2 of Figure 1.
Figure 1:
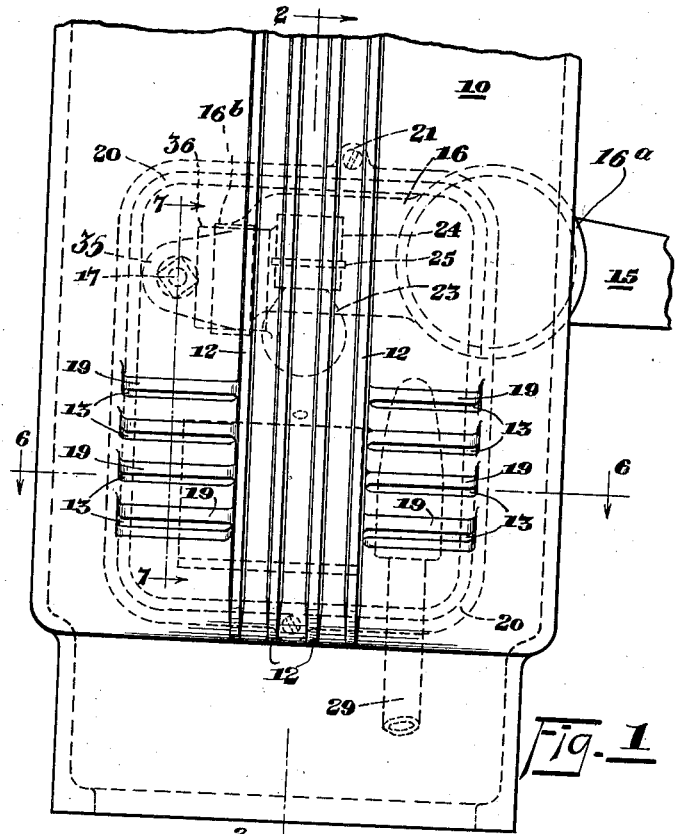
Figure 1 is a fragmentary front elevational view of the seat end standard.
Figure 3:
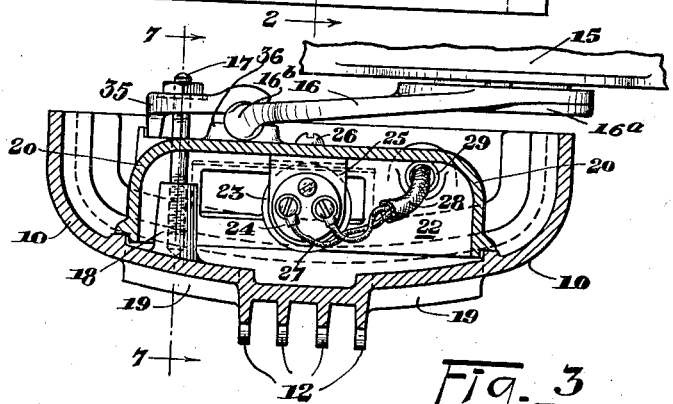
Figure 3 is a sectional view thereof on line 3—3 of Figure 2.

Referring then to the drawings wherein like parts of the structures shown are designated by the same numerals in the several views, and presently to Figures 1 to 8 inclusive, a seat end standard 10, preferably of cast metal and adapted for vertical installation adjacent an aisle 11 of a theatre or the like, has a convexly arcuate outer wall surface provided with a series of spaced parallel vertically disposed ribs 12 which are not only ornamental in appearance but likewise prevent direct and reflected glare from the light emitting openings into the eyes of those seated rearwardly of the seat end standard as hereinafter explained.

This seat end standard is here shown as provided with a vertical series of spaced parallel horizontally elongated light emitting slots 13 disposed on opposite sides of the vertical ribs 12 and below the level of the seat 14 which is mounted adjacent one of its sides upon a seat supporting member 15 of conventional type pivotally mounted upon one end 16a of an arm 16 whose other end is cast to form a vertically disposed spindle portion 16b pivotally disposed in complementary recesses in a clamping member 35 and a boss 36 on the inner side of a dished cover plate 20 secured as hereinafter described to the inner wall of the seat end standard 10. A bolt 17 passing through apertures in the clamping member 35 and the cover plate 20 and threaded in a boss 18 projecting inwardly from the inner wall of the end standard 10, secures the clamping member 35 in position adjacent the cover plate 20 and the spindle portion 16b of arm 16.

Each light emitting opening is provided with an outwardly projecting portion 19 along its upper length which forms a shade or blind to prevent direct or reflected glare into the eyes of occupants of aisle seats rearwardly or oppositely of the aisle lighting seat end standards or in the eyes of patrons passing up or down the aisles of a darkened theatre or auditorium.

A dished cover plate 20 is disposed over the light emitting opening 13 and is secured to the inner wall of the seat end standard 10 as by screws 21 to form a housing 22 for an incandescent electric light bulb 23 whose socket 24 is supported upon a bracket 25 mounted adjacent the inner wall of the cover plate 20 and secured thereto as by a screw 26.

Electric wiring 27 connected to the socket 24 in the conventional manner and wired to a suitable source of electrical energy, passes through a flexible insulating sheathing 28 running exteriorly of the lamp housing 22 through the metal conduit 29 detachably screw-threadedly secured to the cover plate 20. Access to the housing 22 for replacing the incandescent light bulb 23 may be had by removing the closure 30 seated in the horizontally disposed groove 31 of the cover plate 20 and to which cover plate the closure 30 is secured as by the screw 32.

In the modified embodiment of the invention shown in Figures 9 and 10 the lamp socket supporting bracket 25 is secured to the inner wall of the seat end standard as by the screw 26 rather than to the inner wall of the cover plate 20 as in the other embodiment and the metal conduit 29 is passed through an opening 33 in the cover plate, which opening is closed by a flexible washer 34 rather than being screw-threadedly secured to its cover plate. Access to the lamp chamber 22 for replacing the bulb 23 is thus had by removing the cover plate 20.

Since the lamp of incandescent bulb 23 is disposed below the level of the seat 14 and adjacent the floor 11 rather than immediately below the arm rest of the seat end standard as is common in the prior patented art, not only is the occupant of the seat not annoyed by radiated heat from the lamp but the aisle floor adjacent the seat end standard is better illuminated because of the proximity of the light source to the floor of the aisle.

The vertical ribs 12 which are disposed between each vertical tier of light emitting openings 13 and the shades 19 prevent direct and reflected glare into the eyes of patrons seated rearwardly of and across from the aisle illuminating seat end standard and into the eyes of patrons walking up and down the aisles since the series of light emitting openings farthest from any given patron are behind the vertical series of ribs 12 and since the series of light emitting openings nearest any given patron are shaded by the shades 19 disposed above each light emitting opening.

It will thus be seen that the aisle lighting seat end standard of the instant invention has certain novel features over the prior patented art and that it is attractive in appearance, utilitarian in use and reasonably economical in manufacture.

While but several specific embodiments of the invention have been herein shown and described, it will be understood that certain details of the constructions shown may be altered or omitted without departing from the spirit of this invention as the same is defined by the following claims.

We claim:

1. A seat end standard having a vertically disposed rib centrally along its outer wall surface and light emitting openings through its wall on opposite sides of said rib below the level of the supported seat and adjacent the lower end of the standard, a cover disposed over said openings and secured to the inner wall of the standard forming a housing, and a lamp disposed within the housing.

2. A seat end standard having a convexly arcuate outer wall surface provided with a vertically disposed rib centrally of its outer wall surface and a light emitting opening on opposite sides of said rib, a cover disposed over said openings and secured to the inner wall of the standard forming a housing, and a lamp disposed within the housing.

3. A seat end standard having a convexly arcuate outer wall surface provided with a vertically disposed rib centrally of its outer wall surface and a pair of spaced parallel horizontally elongated slots through its wall on opposite sides of said rib forming light emitting openings, a cover disposed over said openings and secured to the inner wall of the standard forming a housing, and a lamp disposed within the housing.

4. A seat end standard having a convexly arcuate outer wall surface provided with a vertically disposed rib centrally of its outer wall surface and having a vertical series of spaced parallel horizontally elongated slots on opposite sides of said rib forming light emitting openings, a cover disposed over said openings and secured to the inner wall of the standard forming a housing, and a lamp disposed within the housing.

5. A seat end standard having a convexly arcuate outer wall surface provided with a vertically disposed rib centrally of its outer wall surface and having a vertical series of spaced parallel horizontally elongated slots on opposite sides of said rib below the level of the supported seat forming light emitting openings, an outwardly projecting rib disposed over each opening, a cover disposed over said openings and secured to the inner wall of the standard forming a housing, and a lamp disposed within the housing.

6. A seat end standard having a convexly arcuate outer wall surface provided with a vertically disposed rib centrally of its outer wall surface and a pair of spaced parallel horizontally elongated slots through its wall on opposite sides of said rib forming light emitting openings, an outwardly projecting rib disposed over each opening, a cover disposed over said openings and secured to the inner wall of the standard forming a housing, and a lamp disposed within the housing.

7. A seat end standard having a convexly arcuate outer wall surface provided with a vertically disposed rib centrally of its outer wall surface and having a vertical series of spaced parallel horizontally elongated slots on opposite sides of said rib forming light emitting openings, an outwardly projecting rib disposed over each opening, a cover disposed over said openings and secured to the inner wall of the standard forming a housing, and a lamp disposed within the housing.

8. A seat end standard having a convexly arcuate outer wall surface provided with an outwardly projecting vertically disposed rib centrally of its outer wall surface and a pair of spaced parallel horizontally elongated slots through its wall on opposite sides of said rib forming light emitting openings, and a rib disposed over each opening and projecting outwardly a lesser distance than said vertical rib, a cover disposed over said openings and secured to the inner wall of the standard forming a housing, and a lamp disposed within the housing.

9. A seat end standard having light emitting openings through its wall, a cover disposed over said openings and secured to the inner wall of the standard forming a housing, a seat supporting member pivotally attached to said housing, a lamp disposed within the housing, said housing having an opening therein through which access to the lamp may be had, and a closure for the opening in said housing.

ERVING M. MORGAN.
CLYDE E. YOST.